(12) United States Patent
Adeli-Nadjafi

(10) Patent No.: US 11,847,660 B2
(45) Date of Patent: Dec. 19, 2023

(54) APPARATUS FOR AUTOMATIC CREDENTIAL CLASSIFICATION

(71) Applicant: Stynt Inc., Boston, MA (US)

(72) Inventor: Alireza Adeli-Nadjafi, Boston, MA (US)

(73) Assignee: Stynt Inc., Boston, MA (US)

( * ) Notice: Subject to any disclaimer, the term of this patent is extended or adjusted under 35 U.S.C. 154(b) by 0 days.

(21) Appl. No.: 17/744,044

(22) Filed: May 13, 2022

(65) Prior Publication Data

US 2023/0368213 A1    Nov. 16, 2023

(51) Int. Cl.
| | |
|---|---|
| G06Q 10/10 | (2023.01) |
| G06Q 10/06 | (2023.01) |
| G06Q 30/08 | (2012.01) |
| G06Q 10/1053 | (2023.01) |
| G06Q 10/105 | (2023.01) |
| G06Q 30/018 | (2023.01) |
| G06N 5/022 | (2023.01) |

(52) U.S. Cl.
CPC ........... *G06Q 30/018* (2013.01); *G06N 5/022* (2013.01); *G06Q 10/1053* (2013.01)

(58) Field of Classification Search
CPC ... G06Q 30/018; G06Q 10/1053; G06N 5/022
USPC .......... 705/320, 321, 1.1–912, 317
See application file for complete search history.

(56) References Cited

U.S. PATENT DOCUMENTS

| | | | |
|---|---|---|---|
| 10,192,048 B2 | 1/2019 | Sharma | |
| 10,354,472 B2 | 7/2019 | Kuklinski et al. | |
| 11,068,908 B1 * | 7/2021 | Wong | G06F 40/216 |
| 11,170,346 B2 * | 11/2021 | Tummuru | H04L 9/3236 |
| 11,558,580 B1 * | 1/2023 | Stewart | H04N 5/91 |
| 11,627,125 B1 * | 4/2023 | Stewart | H04L 63/08 |
| | | | 713/168 |
| 2005/0080656 A1 * | 4/2005 | Crow | G06Q 10/1053 |
| | | | 705/7.14 |

(Continued)

FOREIGN PATENT DOCUMENTS

WO    2021184119    9/2021

OTHER PUBLICATIONS

Faliagka et al., Application of Machine Learning Algorithms to an online Recruitment System, Dec. 31, 2012.

(Continued)

*Primary Examiner* — Jonathan P Ouellette
(74) *Attorney, Agent, or Firm* — Caldwell Intellectual Property Law, LLC

(57) ABSTRACT

An apparatus for automatic credential classification includes at least a processor and a memory that is communicatively connected to the processor, the processor configured to receive an attribute datum including a credential datum, and classify the credential datum to at least a required credential datum by training an attribute classifier using a credential training data wherein credential training data contains a plurality of data entries correlating required credential datum as an input to the required credential data as outputs and generating a credential classification datum, wherein credential classification datum is generated by classifying the credential datum to the required credential datum using the attribute classifier. Processor generates and stores an attribute match datum as a function of the credential classification datum.

20 Claims, 8 Drawing Sheets

(56) References Cited

U.S. PATENT DOCUMENTS

| | | | |
|---|---|---|---|
| 2009/0276209 A1* | 11/2009 | Dane | G06Q 10/063112 704/9 |
| 2010/0070492 A1* | 3/2010 | Dattatri | G06Q 10/00 707/E17.014 |
| 2012/0215795 A1* | 8/2012 | Phelon | G06Q 10/1053 707/E17.014 |
| 2014/0122355 A1* | 5/2014 | Hardtke | G06Q 10/1053 705/321 |
| 2014/0122360 A1* | 5/2014 | Rao | G06Q 10/105 705/321 |
| 2014/0289145 A1* | 9/2014 | Coleman | G06Q 10/1053 705/321 |
| 2015/0006422 A1* | 1/2015 | Carter | G06Q 10/1053 705/321 |
| 2015/0127567 A1* | 5/2015 | Menon | G06Q 10/1053 705/321 |
| 2015/0317606 A1* | 11/2015 | Bubna | G06Q 10/1053 705/321 |
| 2015/0317610 A1* | 11/2015 | Rao | G06F 40/258 705/321 |
| 2015/0339630 A1 | 11/2015 | Grayevsky | |
| 2018/0232751 A1* | 8/2018 | Terhark | G06Q 10/063118 |
| 2018/0308062 A1* | 10/2018 | Quitmeyer | G06Q 10/1053 |
| 2018/0315019 A1* | 11/2018 | Kenthapadi | G06F 16/9535 |
| 2018/0330331 A1* | 11/2018 | Nair | G06Q 10/1053 |
| 2019/0392355 A1 | 12/2019 | O'Malley | |
| 2020/0327504 A1* | 10/2020 | Eidelwein | G06N 20/00 |
| 2021/0056518 A1 | 2/2021 | Ellis et al. | |
| 2021/0150484 A1 | 5/2021 | Mayerle et al. | |
| 2021/0192539 A1 | 6/2021 | Mercury et al. | |
| 2021/0336943 A1 | 10/2021 | Hamel et al. | |
| 2022/0067665 A1* | 3/2022 | Westerheide | G06Q 10/1053 |
| 2022/0147548 A1* | 5/2022 | Verma | G06Q 10/10 |

OTHER PUBLICATIONS

Kato et al., The emergence of alternative credentials, Mar. 10, 2020.

* cited by examiner

APPARATUS FOR AUTOMATIC CREDENTIAL CLASSIFICATION

FIELD OF THE INVENTION

The present invention generally relates to the field of human resource technology. In particular, the present invention is directed to an apparatus for automatic credential classification.

BACKGROUND

Classifying credentials for candidates is an inexact and time consuming process overly reliant on guesswork Programmatic attempts to alleviate this issue are in turn hampered by a lack of knowledge on the part of the programmers themselves.

SUMMARY OF THE DISCLOSURE

In an aspect an apparatus for automatic credential classification is shown. The apparatus may include at least a processor and a memory that is communicatively connected to the processor. A processor may be configured to receive an attribute datum, wherein the attribute datum may include a credential datum. The processor may then classify the credential datum to at least a required credential datum. The classification may include training an attribute classifier using a credential training data wherein credential training data contains a plurality of data entries correlating required credential datum as an input to the required credential data as outputs. Additionally, the classification may include generating a credential classification datum, wherein credential classification datum is generated by classifying the credential datum to the required credential datum using the attribute classifier. The processor then may generate an attribute match datum as a function of the credential classification datum. The attribute match datum may then be stored in a data storage device These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for automatic credential classification. The apparatus may include at least a processor and a memory that is communicatively connected to the processor. A processor may be configured to receive an attribute datum, wherein the attribute datum may include a credential datum. The processor may then classify the credential datum to at least a required credential datum. The classification may include training an attribute classifier using a credential training data wherein credential training data contains a plurality of data entries correlating required credential datum as an input to the required credential data as outputs. Additionally, the classification may include generating a credential classification datum, wherein credential classification datum is generated by classifying the credential datum to the required credential datum using the attribute classifier. The processor then may generate an attribute match datum as a function of the credential classification datum. The attribute match datum may then be stored in a data storage device. Exemplary embodiments illustrating aspects of the present disclosure are described below in the context of several specific examples.

Figure 1:
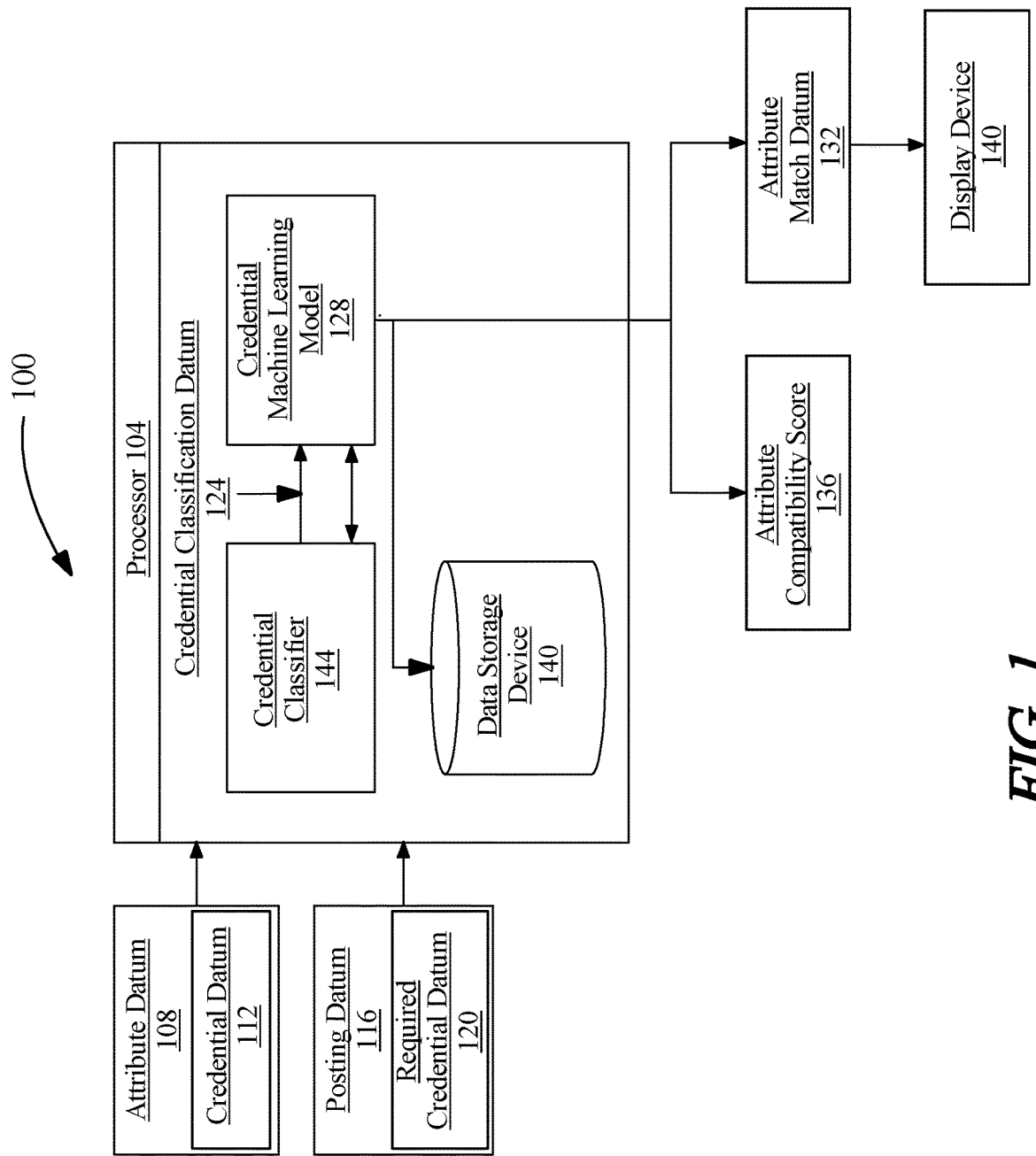
FIG. 1 is a block diagram of an apparatus for automatic credential classification.

Referring now to FIG. 1, an exemplary embodiment of an apparatus 100 for automatic credential classification is illustrated. System includes a processor 104. processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. processor 104may include a single computing device operating independently, or may include two or more computing device operating in concert, in parallel, sequentially or the like; two or more computing devices may be included together in a single computing device or in two or more computing devices. processor 104may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. processor 104may include but is not limited to, for example, a computing device or cluster of computing devices in a first location and a second computing device or cluster of computing devices in a second location. processor 104 may include one or more computing devices dedicated to data storage, security, distribution of traffic for load balancing, and the like. processor 104 may distribute one or more computing tasks as described below across a plurality of computing devices of computing device, which may operate in parallel, in series, redundantly, or in any other manner used for distribution of tasks or memory between computing devices. processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may be configured to receive an attribute datum 108. For the purposes of this disclosure, "attribute datum" is the candidates personal information and/or attributes relevant to a job position of a posting. Attribute datum 108 may be audio and/or visual information related to the user's personal information, attributes, and/or credentials. For example, attribute datum may be a video, audio file, text, and the like. Attribute datum 108 may include a user's prior record, such as a resume, personal address, social security number, phone number, employment history, experience level, education, certification, acquired skills, geographical location, expected compensation, job performance acknowledgements (e.g., awards, honors, distinguishments), photograph of user, sample work product, and the like. Attribute datum 108 may be received by processor 104 by the same or similar means described above. For example, and without limitation, attribute datum 108 may be provided by a user directly, database, third-party application, remote device, immutable sequential listing, social media profile, and the like. In non-limiting embodiments, attribute datum 108 may be provided as independent or unorganized facts, such as answers to prompted questions provided by processor 104 and/or as dependent or organized facts, such as a previously prepared record that the user made in advance.

With continued reference to FIG. 1, attribute datum 108 may include a credential datum 112. For the purposes of this disclosure, "credential datum" is any datum relating to a user's qualifications to perform a given job function. A credential datum 112 may include any credential or certification a candidate has received from any governing body to demonstrate a candidate's qualifications, achievements, personal qualities, or aspects of a candidate's background. In a non-limiting example, credential datum 112 may include any certification, certificate of completion, or license such as driver's license, commercial driver's license, a law license, a medical license, nursing license, professional engineers license, pilots license, pharmacy license, and the like. Additionally, credential datum 112 may include any degrees or educational certifications a candidate may have obtained. Credential datum 112 may include a total number of hours a candidate has placed into a given job and/or trade. Credential datum 112 may be self-reported by a candidate. Credential datum 112 may also be imported from a social network, resume, Curriculum vitae, a human resource website, and the like.

With continued reference to FIG. 1, a credential datum 112 may be used to determine a what posting 116 is qualified for. In a non-limiting example, a candidate may have a credential datum 112 that includes a commercial driver's license. As a function of this credential a candidate may be informed that he/she qualified for a posting 116 as a truck driver. Candidates may have a higher probably of being matched if they have credentials that meet or exceed a required credential datum 120. In some embodiments, a candidate may be informed of the likelihood that they will be matched to a posting 116 as a function of a credential datum 112. However, the candidate may also be informed that they are do not meet the minimum qualifications for a particular posting 116. For example, a candidate who has credential datum 112 that does not include a registered nurses license may be informed that they are do not meet the minimum qualifications for a posting 116 for a registered nurse.

With continued reference to FIG. 1, processor 104 may be configured to authenticate credential datum 112 using an authentication process. As used in the current disclosure, "Authentication Process" is a process wherein a candidate's credential datum 112 is authenticated. In an embodiment, this may include verifying professional licenses, degrees, certifications, employment history, checking references. This process may require a candidate to submit documents that verify his or her credentials. For example, a candidate may have to provide an official transcript from a college or university to verify completion of a degree. A processor 104 may then verify the credentials by contacting the various governing bodies, past employers, and or websites. For example, a candidate, who is an attorney may submit paperwork denoting that they are a member of a Bar Association. A processor 104 may verify that the candidates a member in good standing with the bar by searching the Bar Association's website and/or verifying a candidates paper work. In other embodiments, Processor 104 may be configured to verify a candidates references A processor 104 may send an automated email to the candidate's references to verify the candidate's credentials or requesting a letter of recommendation.

With continued reference to FIG. 1, processor 104 may be configured to receive a posting datum 116. For the purpose of this disclosure, "posting datum" is information related to an available and/or open job position. For the purposes of this disclosure, a "job position" (also referred to in this disclosure as a "job") is a paid occupation with designated tasks associated therewith. A job position may include an employment with an employer, such as work as an employee (part-time or full-time), intern, worker, contractor, self-employed, and the like. For example, and without limitation, posting datum 116 may include information and/or data from a job posting and/or listing that describes an open job position. Posting datum 116 may include a job position title, qualifications and/or requirements for the job position, expected responsibilities associated with the job position, benefits with the job position, wage index, geographical location, employer information, and the like. Posting datum 116 may include information related to an employer's expectations of a person hired for such a job position. For instance, and without limitations, posting datum 116 may include minimum qualifications that a candidate must possess to adequately perform the job position. Qualifications for job position may include education, certification, experience, desired skills and/or abilities, personal qualities, and the like. Posting datum 116 may also include information that a person hired for the job position may expect from the job position. For instance, and without limitation, posting datum 116 may include working hours for the job position, a type of salary, degree of professionalism, and the like. In one or more embodiments, posting datum 116 may include a datum or a plurality of data related to an available job.

In one or more embodiments, posting datum 116 may be provided to or received by processor 104 using various means. In one or more embodiments, posting datum 116 may be provided to processor 104 by a user, such as an employer or human resources professional that is interested in hiring for a job position by the employer of the job position. A user may manually input posting datum 116 into computing device using, for example, a graphic user interface and/or an input device. For example, and without limitation, a user may use a peripheral input device to navigate graphic user interface and provide posting datum 116 to processor 104. Non-limiting exemplary input devices include keyboards, joy sticks, light pens, tracker balls, scanners, tablet, microphones, mouses, switches, buttons, sliders, touchscreens, and the like. In other embodiments, posting datum 116 may be provided to processor 104 by a database over a network from, for example, a network-based platform. Posting datum 116 may be stored in a database and communicated to processor 104 upon a retrieval request form a user and/or from processor 104. In other embodiments, posting datum 116 may be communicated from a third-party application, such as from a third-party application on a third-party server, using a network. For example, posting datum 116 may be downloaded from a hosting website for job listings. In one or more embodiments, processor 104 may extract posting datum 116 from an accumulation of information provided by a database. For instance, and without limitation, computing device may extract needed information from database regarding the job position and avoid taking any information determined to be unnecessary. This may be performed by processor 104 using a machine-learning model, which is described in this disclosure further below.

With continued reference to FIG. 1, posting 116 may include a required credential datum 120. As used in the current disclosure, "required credential datum" is a set of qualities, education, and/or experience that an employer requires candidate must poses to be hired. In an embodiment required credential datum 120 may include any combination of elements from posting datum 116. In other embodiments, required credential datum 120 may be a more refined set of qualifications than that of posting datum 116. In a non-limiting example, required credential datum 120 may require a candidate to possess a doctorate in physics while also having 10 years of experience in the industry. Candidates who do not meet the threshold for the Required credential datum 120 may automatically be rejected. Required credential datum 120 may be determined by an employer input or as a function of the attribute datum 108 of employees currently in the role.

Still referring to FIG. 1, processor 104 may classify attribute datum 108 as a function of credential datum 112 and/or required credential datum 120. Candidates may be classified based upon their skill, experience, and aptitude to fulfill the job functions, posting datum 116, required credential datum 120, attribute datum 108, and credential datum 112, and the like. For example, attribute datum 108 may be classified based any one or combination of skills as stated within a required credential datum 120. In another non limiting example, attribute datum 108 may be classified based on matching credential datum 112 to a required credential datum 120. Attribute datum 108 may be classified based on their experience, skills, availability, among other considerations. Candidates may also be classified based on the absence or presence of any skill, trait, experience, as described by required credential datum 120. In some embodiment, candidates may be classified as a function of an employer input. As used in the current disclosure, an "employer input" is an element of datum that is added by the employer. In an embodiment, an employer input may include a specific trait that an employer want to see. In an non limiting example, grade point, a degree and/or certification in a given field, professional licenses, graduated from a specific schools, candidate location, candidate work experience, and the like.

With continued reference to FIG. 1, Processor 104 may be configured to classify candidates using a credential classifier machine learning model 144 Whereas inputs to the to the machine learning model may include attribute datum 108, credential datum 112, required credential datum 120, and posting 116. The output to the classifier may be credential classification datum 124. Classification training data is a plurality of data entries containing a plurality of inputs that are correlated to a plurality of outputs for training a processor by a machine-learning process to align and classify attributes. Classification training data may contain information about the job candidate, attribute datum 108, credential datum 112, required credential datum 120, posting 116, geographical datum, wage index, and authentication process. Classification training data may include any attribute match datum 132 stored in a database, remote data storage device, or a user input or device. Classification training data may be generated from any past or present attribute datum 108, credential datum 112, required credential datum 120, and posting 116., geographical datum, wage index, an authentication process. attribute datum 108, credential datum 112, required credential datum 120, and posting 116., geographical datum, wage index, an authentication process. Classification training data may be configured to correlate attribute datum 108 to a posting 116. In other embodiments, classification training data may be configured to correlate credential datum 112 to required credential datum 120. Processor 104 may include attribute classifier using a classification algorithm, defined as a processes whereby a processor 104 derives, from training data, a model known as a "classifier" for sorting inputs into categories or bins of data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, Processor 104 may be configured to generate credential classification datum 124. As used in the current disclosure, "credential classification datum" is a manner of grouping, matching, or sorting attributes as a function of attribute datum 108, credential datum 112, required credential datum 120, and posting 116 may include sorting, grouping, matching, ranking of job candidates. Job candidates may be classified based on any combination of traits, skills, experiences disclosed within credential datum and/or job candidate datum. In a non-limiting example, a credential classification datum may pair a user's credential datum 112 to the required credential datum 120 of a posting 116. Additionally, credential classification datum may pair a user's credential datum 112 to a wage index. Furthermore, the pairing of a credential datum 112 to a wage index may then be paired to a posting 116. In a further non-limiting example, credential classification datum may include a pairing of an candidate's credential datum 112 with a posting 116.

Still referring to FIG. 1, processor 104 may identify a plurality of candidate traits and classify these job candidates by any of their traits disclosed in attribute datum 108 or credential datum 112. Alternatively or additionally, processor 104 may identify plurality of classification datum by querying an attribute data base. using user-entered data. In an embodiment, "attribute database" may include any data structure for ordered storage and retrieval of data, which may be implemented as a hardware or software module. classification database may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a classification database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a classification database may reflect categories, cohorts, and/or populations of data consistently with this disclosure.

With continued reference to FIG. 1, machine-learning processes may include classification algorithms, defined as processes whereby a processor 104 derives, from training data, a model for sorting inputs into categories or bins of data. Classification may be performed using, without limitation, linear classifiers such as without limitation logistic regression and/or naive Bayes classifiers, nearest neighbor classifiers including without limitation k-nearest neighbors classifiers, support vector machines, decision trees, boosted trees, random forest classifiers, and/or neural network-based classifiers, fuzzy logic.

Still referring to FIG. 1, processor 104 may be configured to generate candidate classifier 120 using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate candidate classifier 120 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, processor 104 may be configured to generate attribute match datum 132. As used in the current disclosure, "attribute match datum" is an element of datum that demonstrates how well a candidate is suited to fulfill the job requirements of a posting 116. In an embodiment, attribute match datum 132 may be a calculation of how well a candidate's credential datum 112 is paired to a required credential datum 120. Attribute match datum 132 may reflected as a percentage or an attribute compatibility score 136. A candidate may be accepted as a function of attribute match datum 132.

With continued reference to FIG. 1, processor 104 may be configured to generate attribute match datum 132 using a as a function of credential classification datum. Whereas inputs to the to the machine learning model may include attribute datum 108, credential datum 112, required credential datum 120, posting 116, geographical datum, wage index, and/or an authentication process. The output to the machine learning model is attribute match datum 132. Credential training data is a plurality of data entries containing a plurality of inputs that are correlated to a plurality of outputs for training a processor by a machine-learning process to align to match job candidates with job postings. Credential training data may contain information about the job candidate, job attribute datum 108, credential datum 112, required credential datum 120, posting 116, credential classification datum 124. Credential training data may include any credential classification datum 124 or candidate datum 132 stored in a database, remote data storage device, or a user input or device.

In one or more embodiments, processor 104 may implement a compatibility algorithm or a machine-learning module, such as credential machine-learning module 128, to determine a attribute compatibility score 136 between credential datum 112 and required credential datum 120. For the purposes of this disclosure, a "attribute compatibility score" is a measurable value representing a relevancy of a user's characteristics with qualifications of a job position. In one or more non-limiting embodiments, attribute compatibility score 136 may be a quantitative characteristic, such as a numerical value within a set range. For example, a attribute compatibility score may be a "2" for a set range of 1-10, where "1" represents a job position and user having a minimum compatibility and "10" represents credential datum 112 and required credential datum 120 having a maximum compatibility. In other non-limiting embodiments, attribute compatibility score 136 may be a quality characteristic, such as a color coding, where each color is associated with a level of compatibility. In one or more embodiments, if an attribute compatibility score 136 is "low", then a user and a job position are considered to have a minimum compatibility; if an attribute compatibility score 136 is "high", then a user and a job position are considered to have a maximum compatibility.

For the purposes of this disclosure, a "compatibility algorithm" is an algorithm that determines the relevancy of a user's credential datum 112 with required credentials 120. If multiple candidates apply to a posting datum 116, then the compatibility scores between each user's credential datum 112 and the required credential datum 120 may be ranked so that the user may determine which job position the user is most compatible with of the job positions. In an embodiment, a compatibility algorithm may be configured to optimize input datum to find a posting 112 is the best fit. Additionally, if an employer is considering a plurality candidates, then the compatibility scores between each candidate of the plurality of candidates be ranked so that the employer may determine which candidates are most compatible with of the posting. Compatibility algorithm may include machine-learning processes that are used to calculate a set of compatibility scores. Machine-learning process may be trained by using training data associated with past calculations and/or information for the job position and user, such as data related to past prior compatibility scores, past and present attribute datum 108 or credential datum 112, posting datum 116, posting datum history, or any other training data described in this disclosure. Attribute compatibility score 136 may be determined by, for example, if a certain numerical value of employment position data matches user data, where the more employment position data that matches user data, the higher the score and the greater the compatibility between the user and the job position. For example, and without limitation, posting datum 116 may include a qualification of requiring a teacher with at least five years of work experience, and attribute datum 108 may include seven years of work experience in teaching, then a numerical value representing compatibility score 136 may be increased due to the data correlating, thus indicating user is more compatible for the job position because of the provided attribute datum 108. In an embodiment, compatibility algorithm may be received from a remote device. In some embodiments, compatibility algorithm is generated by processor 104. In one or more embodiments, compatibility algorithm may be generated as a function of a user input.

In one or more embodiments, a machine-learning process may be used to determine compatibility algorithm or to generate a machine-learning model that may directly calculate attribute compatibility score 136 or attribute match datum 132. In one or more embodiments, a machine-learning model may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning module may determine an output, such as accepting a candidate 144, for an input, such as attribute datum 108, posting datum 116, credential datum 112, and required credential datum 120, Attribute compatibility score 136, attribute match datum 132, geographical datum, wage index, an authentication process. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements.

Still referring to FIG. 1, processor 104 may compute a score associated with attribute match datum 132 and/or attribute compatibility score 136. Attribute match datum 132 may be configured to minimize and/or maximize the score, depending on whether an optimal result is represented, respectively, by a minimal and/or maximal score; a mathematical function, described herein as an "objective function," may be used by processor 104 to score each possible pairing. Objective function may be based on one or more objectives as described below. Processor 104 may pair a predicted route, with a given courier, that optimizes an objective function. In various embodiments a score of a particular attribute match datum 132 may be based on a combination of one or more factors, including credential classification datum 124, credential datum 112, and required credential datum 120. Each factor may be assigned a score based on predetermined variables. In some embodiments, the assigned scores may be weighted or unweighted.

Optimization of objective function may include performing a greedy algorithm process. A "greedy algorithm" is defined as an algorithm that selects locally optimal choices, which may or may not generate a globally optimal solution. For instance, processor 104 may select credential classification datum 124, credential datum 112, and/or required credential datum 120 so that scores associated therewith are the best score for each element of datum and/or for each courier. In such an example, optimization may determine the combination of routes such that each delivery pairing includes the highest score possible.

Still referring to FIG. 1, objective function may be formulated as a linear objective function, which processor 104 may solve using a linear program such as without limitation a mixed-integer program. A "linear program," as used in this disclosure, is a program that optimizes a linear objective function, given at least a constraint. In various embodiments, apparatus 100 may determine attribute match datum 132 that maximizes a total score subject to a constraint that may include classification datum 124, credential datum 112, and/or required credential datum 120. A mathematical solver may be implemented to solve fort attribute match datum 132 that maximizes scores; mathematical solver may be implemented on processor 104 and/or another device in apparatus 100, and/or may be implemented on third-party solver.

With continued reference to FIG. 1, optimizing objective function may include minimizing a loss function, where a "loss function" is an expression an output of which an optimization algorithm minimizes to generate an optimal result. As a non-limiting example, processor 104 may assign variables relating to a set of parameters, which may correspond to score components as described above, calculate an output of mathematical expression using the variables, and select credential classification datum 124, credential datum 112, and required credential datum 120 that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

In one or more embodiments, apparatus 100 may further include a Data storage device 140. Data storage device 140 may be communicatively connected to processor 104 and may be configured to store information and/or datum related to apparatus 100, such as job posting datum 116, Attribute datum 108, information related to credential classification datum 124, attribute match datum 132, compatibility score 136, posting datum 116, and the like. In one or more embodiments, Data storage device 140 is communicatively connected to a processor and configured to contain instructions configuring processor to determine the record recommendation. Data storage device 140 may be configured to store information and datum related to posting match recommendation. For example, Data storage device 140 may store previously prepared records (e.g., draft resumes), customized records generated by processor 104, Job posting datum 116, Attribute datum 108, attribute match datum 132, classification datum, and the like. In one or more embodiments, memory component may include a storage device, as described further in this disclosure below.

With continued reference to FIG. 1, a "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display in communication with processor 104; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface configured to display any information from processor 104 and/or any computing device. In a non-limiting embodiment, a user may utilize user device to view a plurality of information regarding attribute datum 108, posting datum 116, credential datum 112, and required credential datum 120, Attribute compatibility score 136, attribute match datum 132, geographical datum, wage index, an authentication process.

With continued reference to FIG. 1, Processor 104 may send a notification a user device as a function of the attribute match datum. In the current disclosure, a notification may include any sonic, textual, or visual notification generated by a user device. Notifications may include emails, text message, phone calls, intra-app notifications, inter-app notifications, and the like. In embodiments, a notification may alert a user, such as a human resource professional, that a candidate's credential datum 108 match the required credential datum 120. In other embodiments, a notification may be sent as a function of a candidates Attribute compatibility score 136. A notification indicate that a candidate has been accepted and to initiate the confirmation process. A notification may be sent denoting that a candidate's attribute match datum is ready for review. Notifications may also be sent to inform a candidate that they have been rejected as a function of their match datum.

With continued reference to FIG. 1, processor 104 may be configured to automatically accept a candidate as a function of acceptance datum. As used in the current disclosure, "accepting a candidate" is allowing a candidate to bypass the hiring process and be hired immediately based on their credentials. The determination to accept a candidate may be based on a plurality of factors including required credential datum 120, attribute compatibility score 136, attribute match datum 132, geographical datum, wage index, an authentication process, references, and the like. Accepting a candidate may be done by using a candidate classifier machine learning model.

Accepting a candidate may also include a confirmation process. For instance, and without limitation, calculating a candidate acceptance may be consistent with disclosure of candidate acceptance in U.S. patent application Ser. No. 17/743,996 and titled "APPARATUS FOR AUTOMATIC POSTING ACCEPTANCE," which is incorporated herein by reference in its entirety.

With continued reference to FIG. 1, accepting a candidate may include a consideration of an confirmation process. As used in the current disclosure, a "confirmation process" is a process where both the employer and the candidate agree to the terms of the hiring process. In a non-limiting example, a confirmation process may first notify the employer that a candidate is eligible to be automatically hired. The employer then may be required to approve the offer of employment before it is sent to the client. At this stage, the employer may verify that the terms of employment, this may include salary, hourly rate, payment schedule, benefits, start date, work location, length of employment, type of employment, specific job responsibilities, and the like. In some embodiments, processor 104 may be configured to output terms of employment for the employers approval. After the employer confirms the terms of employment, the final offer is sent to the candidate. Once, the candidate accepts the offer the candidate has been automatically hired. In embodiments, this final offer may have a pre-determined time period for acceptance.

With continued reference to FIG. 1, accepting a candidate may include a consideration of a wage index. As used in the current disclosure, a "wage index" is an estimated range of monetary compensation an employee will receive for a given position. For example, monetary compensation may include cash, stock options, cryptocurrency, benefits, retirement contributions, insurance, and the like. Monetary compensation may include wages, overtime wages, salary, piece work rate, commission, bonus, tips, and the like. In some embodiments, a desired wage index may be input into a processor 104 by a user. In other embodiments, a wage index may be input into a processor 104 by a candidate or an employer based on a job posting 116. Wage index may be calculated based on based on attribute datum 108. Wage index may also be calculated based on the availability of candidates or job postings 116. Wage index may also be calculated based on the monetary compensation of candidates whose experience, qualifications, and education are similar to the current candidate. In a non-limiting example, a processor 104 may compare the wage index of the candidate to the wage index of the current posting 116 to determine if a candidate will be accepted. For example, a candidate may be accepted if there is an overlap between the candidates wage index and the posting's wage index. For instance and without limitation, calculating a Wage Index may be consistent with disclosure of Wage Index in U.S. patent application Ser. No. 17/743,958 and titled "APPARATUS FOR WAGE INDEX CLASSIFICATION," which is incorporated herein by reference in its entirety.

With continued reference to FIG. 1, wage index may include a geographical wage index. As used in the current disclosure, "geographical wage index" is a wage index that includes only a pre-determined geographic area. Geographical wage index may group candidate wage index and/or posting wage index together as a function of their geographic proximity. In embodiments, Geographic proximity may include any radius from a given point. Geographic proximity may also include a city, county, state, zip code, area code, and the like. For example, the wage indexes for investment bankers may be classified as a function of being located in New York City. In another example, wage indexes for an investment banker may be classified as a function of being located in Los Angeles County.

With continued reference to FIG. 1, processor 104 may be configured to place candidate match datum through an encryption process. In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from a lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamperproofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running a lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 1, Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 2:
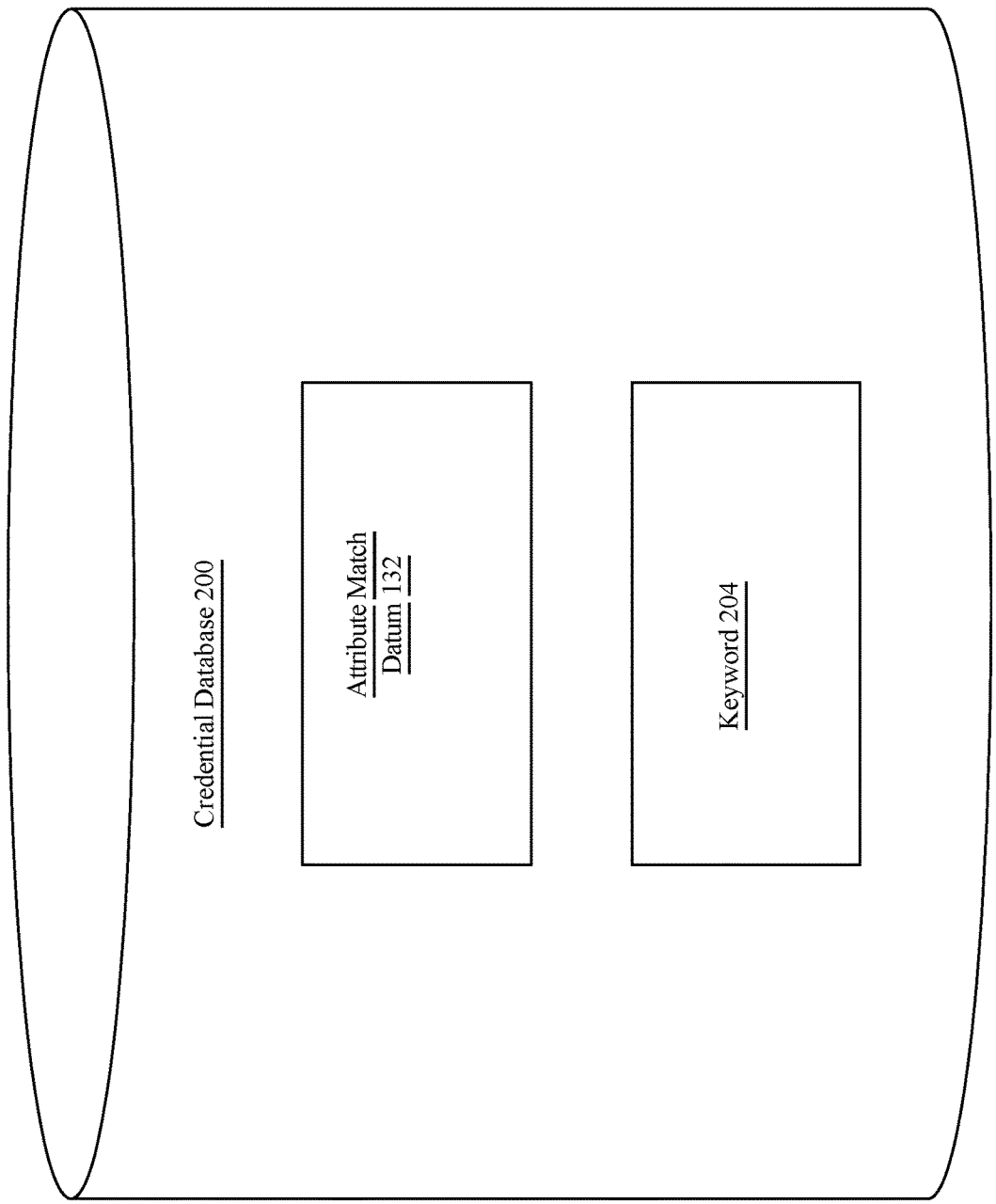
FIG. 2 is a diagrammatic representation of an attribute database.

Now referring to FIG. 2, an exemplary attribute database 200 is illustrated by way of block diagram. Past or present candidate match datum 132 may be stored in a attribute database 200 (also referred to as "database"). Processor 104 may be communicatively connected with attribute database 200. For example, in some cases, database 200 may be local to processor 104. Alternatively or additionally, in some cases, database 200 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Network may use an immutable sequential listing to securely store database 200. Additionally or alternatively, each wage index, metrics thereof, etc. may be stored in an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Continuing to reference FIG. 2, database 200 may store a plurality of past candidate match datum 204. Attribute match datum 132 may be generated using the attribute database 200. As used in this disclosure, "attribute database" is a data structure configured to store data associated with a plurality of attribute match datum 132 and Attribute compatibility score 136. Database 200 may comprise of Attribute match datum 132 from the same employer or from connected employers. Database 200 may comprise of all postings from a job board or a job aggregator website. Attribute match datum 132 and attribute compatibility score 136 may be uploaded to attribute database from at least a remote device. A "remote device," as used in this disclosure, is a computing device, including but not limited to a mobile device such as a smartphone, tablet, laptop, desktop, and the like. Attribute database 200 may comprise of Attribute match datum 132 in their entirety or of candidate acceptance keyword 208. As used in this disclosure, a "keyword" is any meaningful word or syntax. For example without limitation, a keyword 208 may be "mechanical engineer" in the instance that a posting is looking for a mechanical engineer. In another nonlimiting example, a keyword 204 may be "remote" in an example where the posting is a remote job. Database 200 may be implemented, without limitation, as a relational database, a key-value retrieval datastore such as a NOSQL database, or any other format or structure for use as a datastore that a person skilled in the art would recognize as suitable upon review of the entirety of this disclosure.

Figure 3:
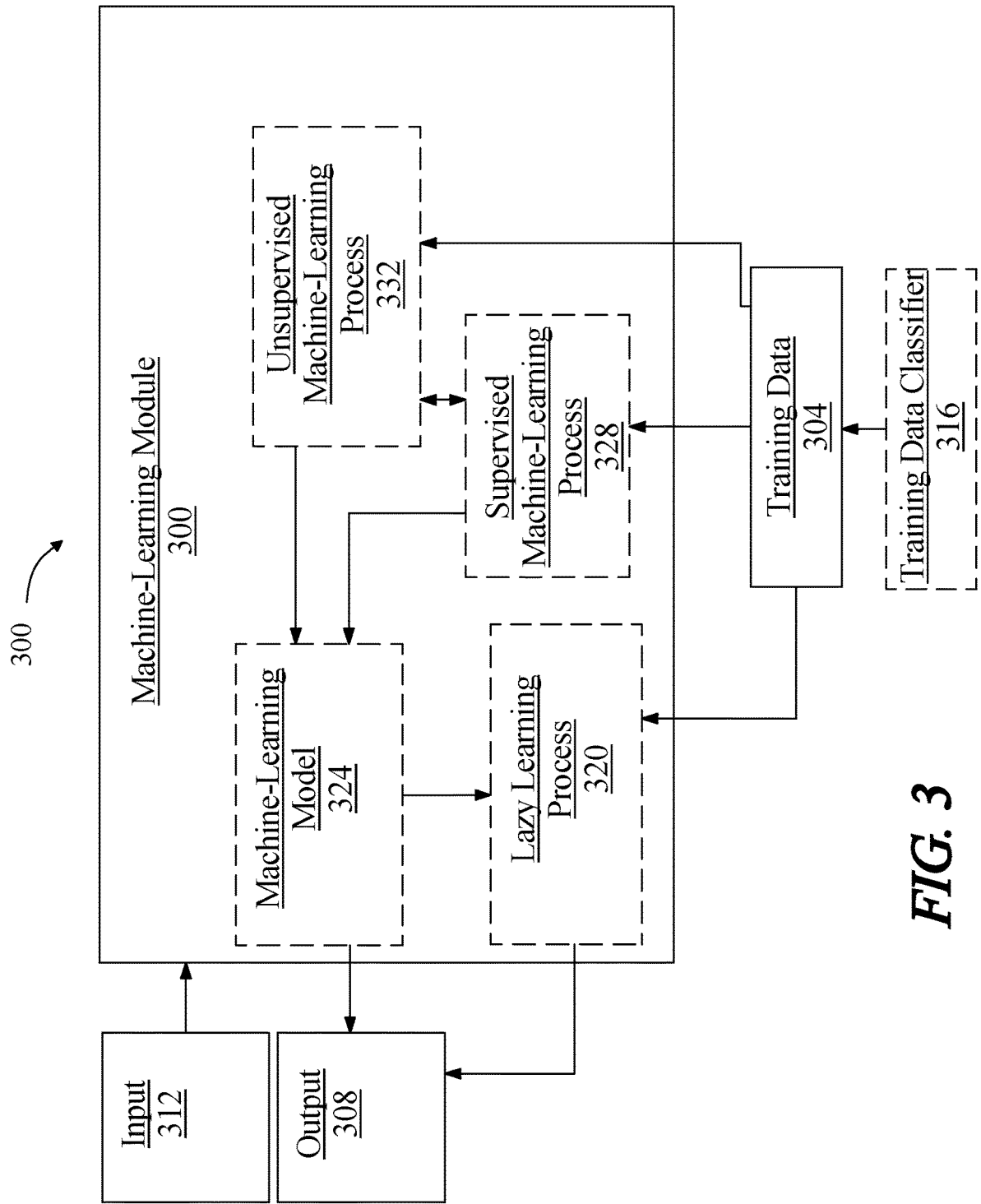
FIG. 3 is a block diagram of exemplary machine-learning processes.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example input data may include attribute data tables and output data may include matching opportunity postings.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories of opportunity postings.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include attribute data tables as described above as inputs, matching opportunity postings as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
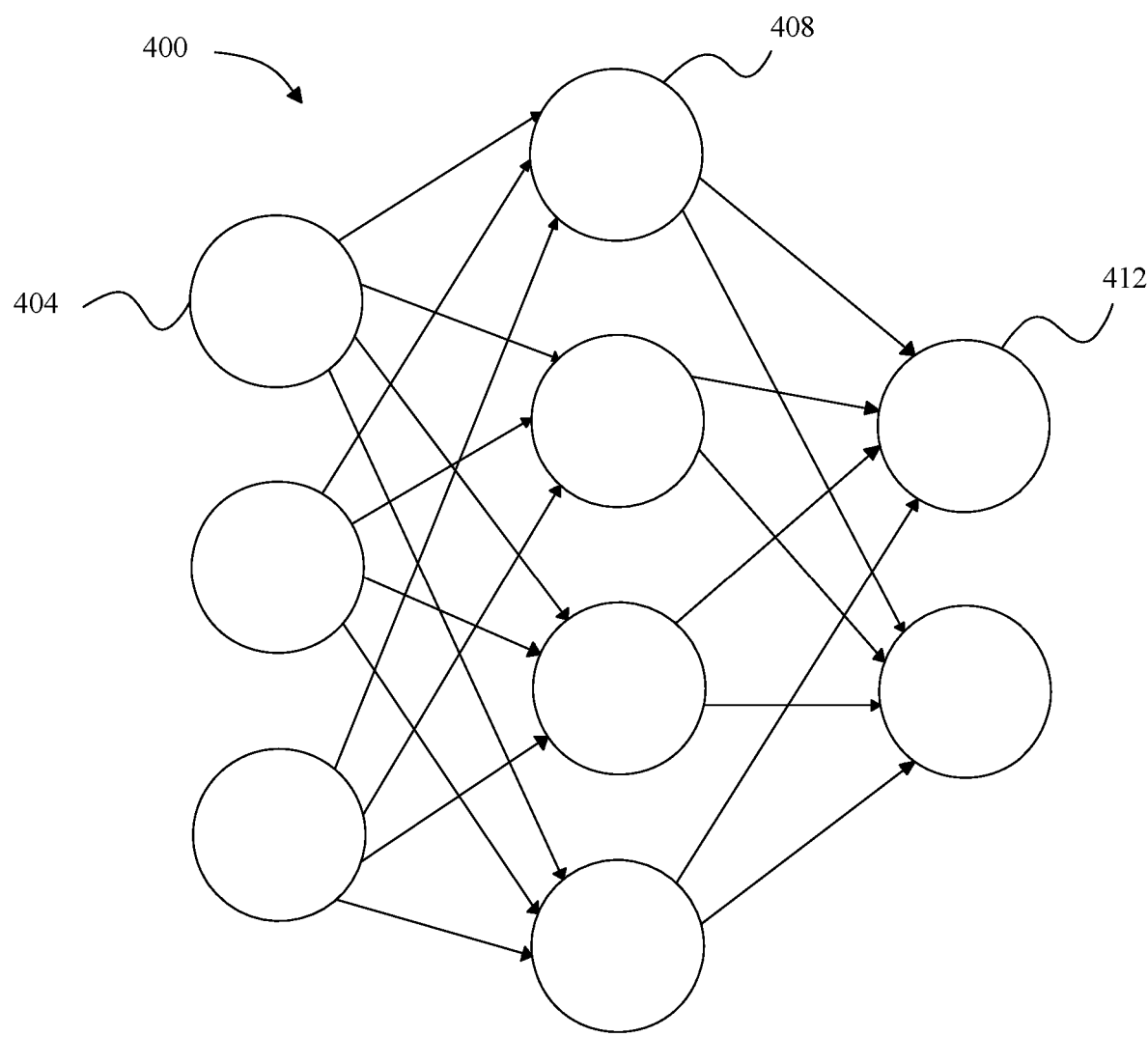
FIG. 4 illustrates an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
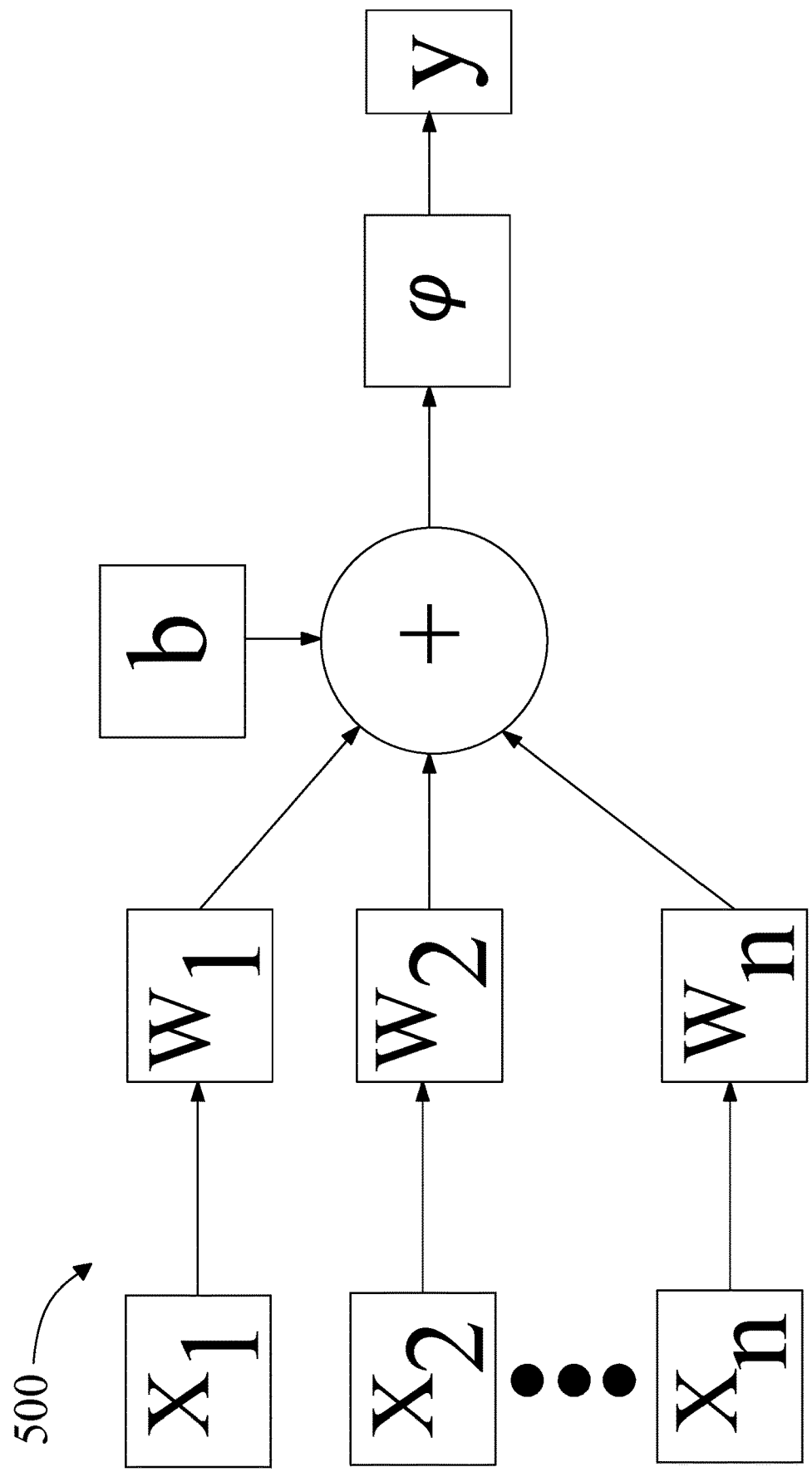
FIG. 5 is a block diagram of an exemplary node.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
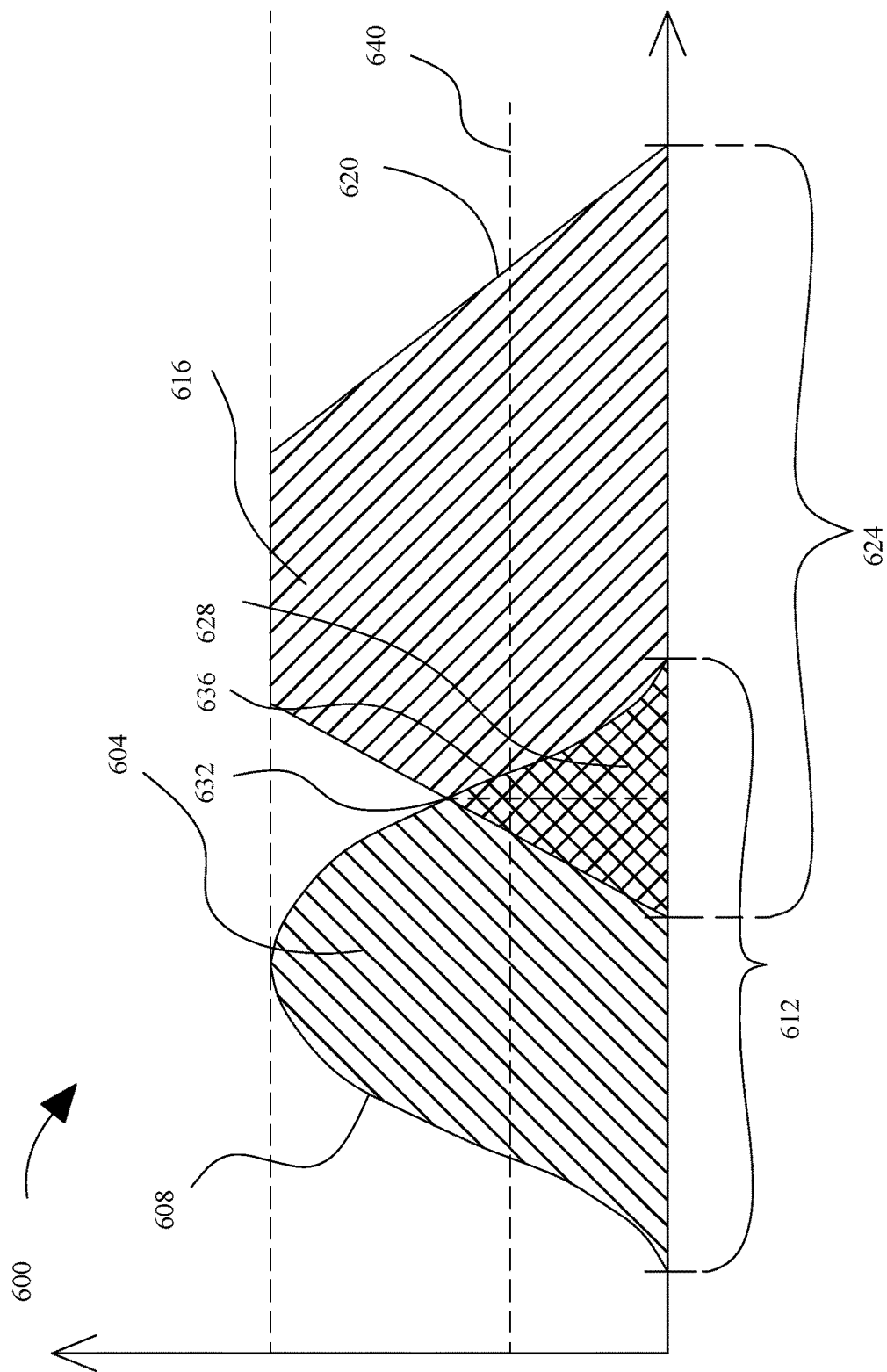
FIG. 6 is a graph illustrating an exemplary relationship between fuzzy sets.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent compatibility threshold 176 and its ranges from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input and/or output candidate match datum 132. For instance, an acceptance variable may represent a first measurable value pertaining to the classification of candidates to required credential datum 120 such as the amount of experience and/or education that a candidate has. Continuing the example, an output variable may represent the attribute compatibility score 136 or an attribute match datum 132. In an embodiment, an attribute compatibility score 136 or an attribute match datum 132 may be represented by its own fuzzy set. In other embodiments, an attribute compatibility score 136 or an attribute match datum 132 may be represented by the function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b-a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any software component datum, any source repository datum, any malicious quantifier datum, any predictive threshold datum, any string distance datum, any resource datum, any niche datum, and/or any combination of the above. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, attribute datum 108 may indicate a sufficient degree of overlap with the posting datum 116 required credential datum 120 for combination to occur as described above. There may be multiple thresholds; for instance, a second threshold may indicate a sufficient match for purposes of past posting and posting query as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if two malicious quantifiers have fuzzy sets matching a malicious component fuzzy set by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Referring back to FIG. 1, processor 104 may match a credential datum 112 to required credential datum 120 when provided attribute compatibility score 136 is within a predetermined threshold. Postings 116 may be posted on any job board and/or job aggregator website specified by an employer. For instance and without limitation, if attribute compatibility score 136 of a candidate is between a 8 and 10 (using the scoring system in a previous example), then the processor 104 may accept the candidate. As used in this disclosure, a "predetermined threshold" is a limit and/or range of an acceptable quantitative value and/or combination of values such as an n-tuple or function such as linear function of values, and/or representation related to the scoring of a posting. Predetermined threshold may be determined by the employer or user of apparatus 100. Additionally or alternatively, predetermined threshold may be determined by processor 104 using a machine learning module 300.

With continued reference to FIG. 1, predictive scoring metric is displayed to the employer. Predictive scoring metric is displayed using a graphic user interface (GUI). Alternatively or additionally, attribute compatibility score 136 may be displayed using a GUI. GUI may include a plurality of lines, images, symbols. GUI may be displayed on a display device. Display device may include, but is not limited to, a smartphone, tablet, laptop, monitor, tablet, and the like. Display device may include a separate device that includes a transparent screen configured to display computer generated images and/or information. The employer may view the information displayed on the display device in real time.

Figure 7:
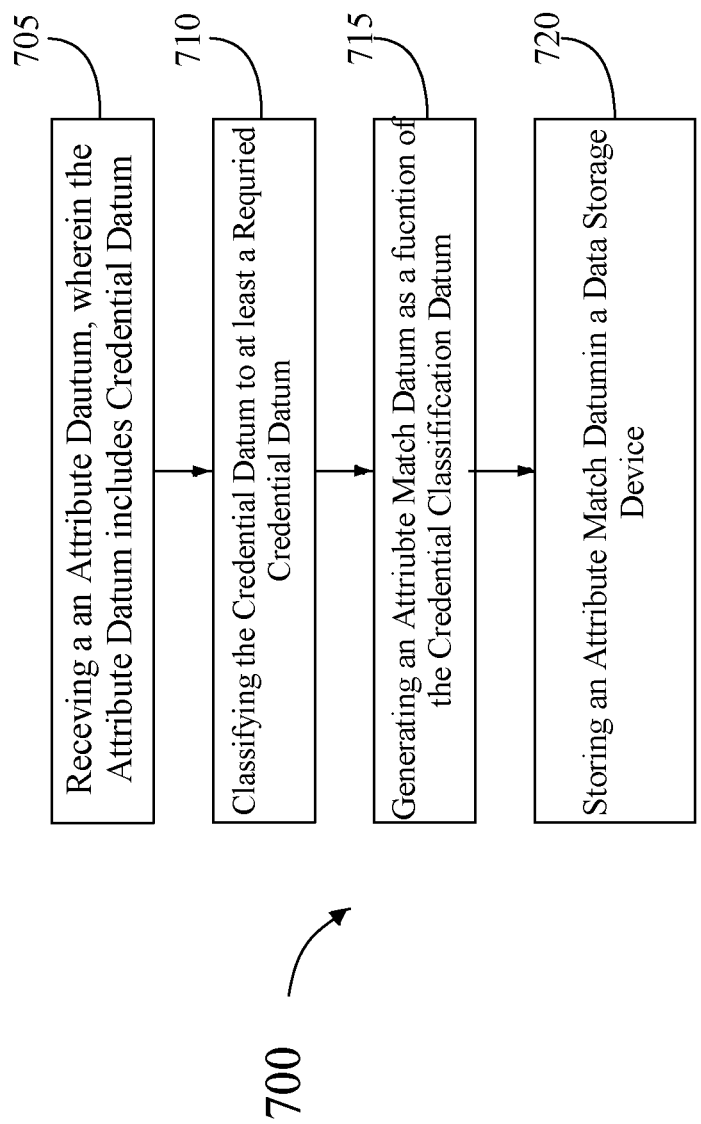
FIG. 7 is a flow diagram of an exemplary method for automatic credential classification.

Referring now to FIG. 7, an exemplary method 700 of automatic posting acceptance is illustrated. At step 705, a processor receives an attribute datum wherein a posting datum includes an credential datum, without limitation, as described above in reference to FIGS. 1-7.

At step 710, a processor classifies the credential datum to at least a required credential datum, without limitation, as described above in reference to FIGS. 1-7.

At step 715, a processor generates an attribute match datum as a function of the credential classification, without limitation, as described above in reference to FIGS. 1-7.

At step 720, a processor stores an attribute match datum as a function of the credential classification, without limitation, as described above in reference to FIGS. 1-7.

Still referring to FIG. 7, An attribute match datum may be transmitted to a display device. The attribute match datum may also be generated using fuzzy logic. A computing device may further be configured to send a notification a user device as a function of the attribute match datum. A attribute match datum may be placed though an encryption process. The attribute match datum may be placed through a verification process. A processor may further be configured to generate an attribute compatibility score. A candidate may be accepted as a function of the attribute compatibility score. A processor may classify an attribute datum to a wage index. A processor may further be configured to rank the candidate match datum.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
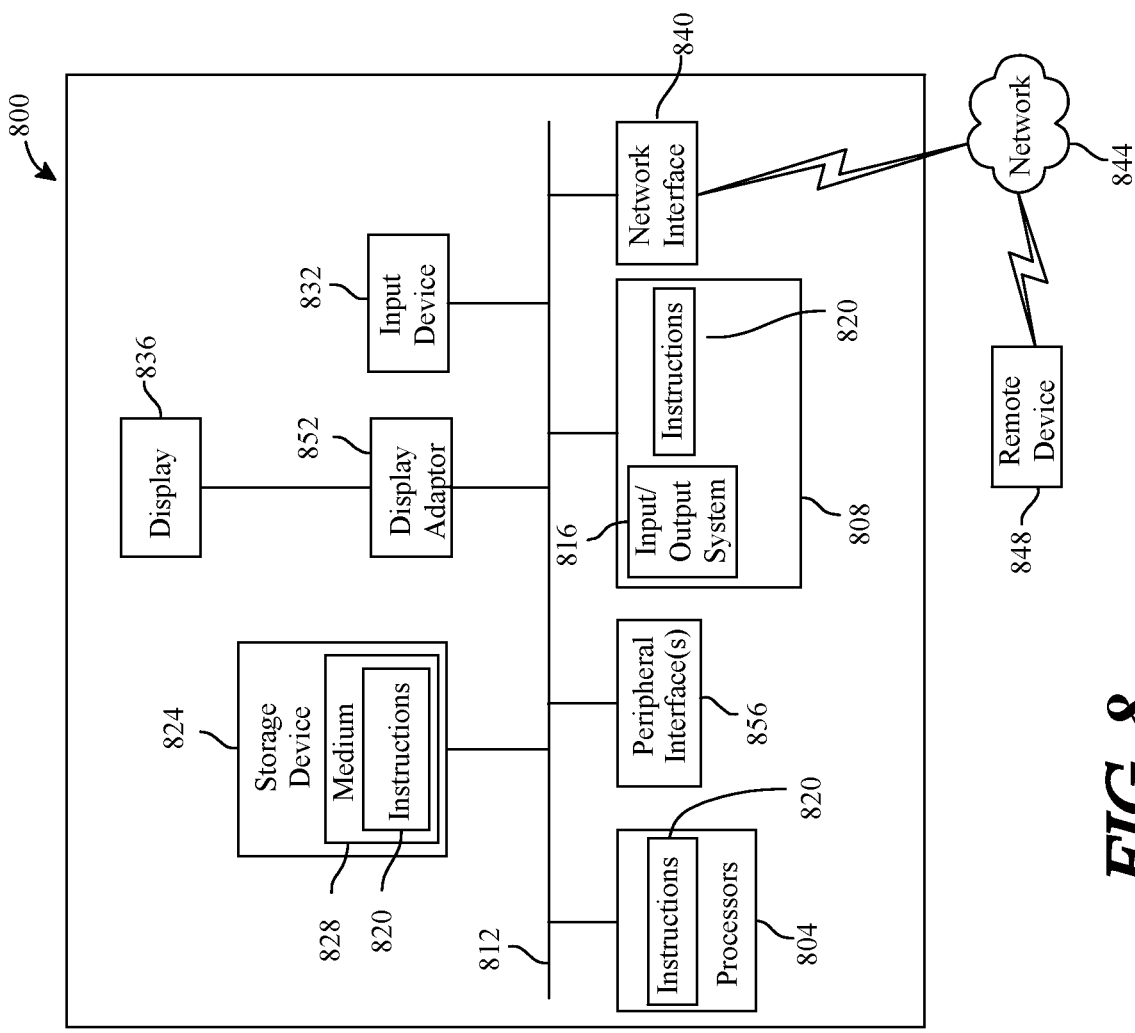
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for automatic credential classification, wherein the apparatus comprises:
   at least a processor; and
   a memory communicatively connected to the at least a processor, the memory containing instructions configuring the at least a processor to:
      receive an attribute datum, wherein the attribute datum includes a credential datum comprising at least a license of a user;
      classify the credential datum to at least a required credential datum, wherein classifying the credential datum further includes:
         training an attribute classifier using a credential training data wherein the credential training data contains a plurality of data entries correlating credential data inputs to required credential data outputs;
         updating the credential training data as a function of the credential data inputs correlated to the required credential data outputs;
         retraining the attribute classifier with an updated credential training data wherein the updated credential training data further comprises applying weighted values to the credential data inputs and adjusting the weighted values of the credential data inputs to adjacent layers of the required credential data outputs; and
         generating a credential classification datum, wherein the credential classification datum is generated by classifying the credential datum to the required credential datum using the trained attribute classifier;
      generate an attribute match datum as a function of the credential classification datum;
      store the attribute match datum in a data storage device as an immutable sequential listing;
      generate a confirmation as a function of the attribute match datum; and
      initiate a notification to a device of the user as a function of the attribute match datum, wherein the notification further comprises at least an alert indicating the credential datum matches the required credential datum.

2. The apparatus of claim 1, wherein the processor is configured to transmit the attribute match datum to a display device.

3. The apparatus of claim 1, wherein the processor is configured to generate the attribute match datum using fuzzy logic.

4. The apparatus of claim 1, wherein the attribute match datum is placed though an encryption process.

5. The apparatus of claim 1, wherein the attribute match datum is placed through a verification process.

6. The apparatus of claim 1, wherein the processor is further configured to generate an attribute compatibility score.

7. The apparatus of claim 6, wherein the processor is further configured to accept a candidate as a function of the attribute compatibility score.

8. The apparatus of claim 1, wherein the processor is further configured to classify the attribute datum to a wage index.

9. The apparatus of claim 1, wherein the processor is further configured to rank the attribute match datum.

10. The apparatus of claim 1, wherein generating the attribute match datum further comprises:
   training a neural network including an input layer of nodes, at least an intermediate layer of nodes and an output layer of nodes, wherein training the neural network further comprises creating connections between the nodes by:
     applying credential classification data inputs of a second training data to the input layer of nodes of the neural network; and
     adjusting connections and weights, using a training algorithm, between nodes in adjacent layers of the neural network to produce values for attribute match data outputs at the outer layer of nodes of the neural network; and
   generating the attribute match datum as a function of the credential classification datum using the trained neural network.

11. A method for automatic credential classification, wherein the method comprises:
   receiving, by a processor, an attribute datum, wherein the attribute datum includes a credential datum comprising at least a license of a user;
   classifying, by the processor, the credential datum to at least a required credential datum, wherein classifying the credential datum further includes:
     training an attribute classifier using a credential training data, wherein the credential training data contains a plurality of data entries correlating credential data inputs to required credential data outputs
     updating the credential training data as a function of the credential data inputs correlated to the required credential data outputs;
     retraining the attribute classifier with an updated credential training data wherein the updated credential training data further comprises applying weighted values to the credential data inputs and adjusting the weighted values of the credential data inputs to adjacent layers of the required credential data outputs; and
     generating a credential classification datum, wherein the credential classification datum is generated by classifying the credential datum to the required credential datum using the trained attribute classifier;
   generating, by the processor, an attribute match datum as a function of the credential classification datum;
   storing, by the processor, the attribute match datum in a data storage device as an immutable sequential listing;
   generating, by the processor, a confirmation as a function of the attribute match datum; and
   initiating, by the processor, a notification to a device of the user as a function of the attribute match datum, wherein the notification further comprises at least an alert indicating the credential datum matches the required credential datum.

12. The method of claim 11, wherein the processor is configured to transmit the attribute match datum to a display device.

13. The method of claim 11, wherein the processor is configured to generate the attribute match datum using fuzzy logic.

14. The method of claim 11, wherein the attribute match datum is placed though an encryption process.

15. The method of claim 11, wherein the attribute match datum is placed through a verification process.

16. The method of claim 11, wherein the processor is further configured to generate an attribute compatibility score.

17. The method of claim 16, wherein the processor is further configured to accept a candidate as a function of the attribute compatibility score.

18. The method of claim 11, wherein the processor is further configured to classify the attribute datum to a wage index.

19. The method of claim 11, wherein the processor is further configured to rank the attribute match datum.

20. The method of claim 11, wherein generating the attribute match datum further comprises:
   training a neural network including an input layer of nodes, at least an intermediate layer of nodes and an output layer of nodes, wherein training the neural network further comprises creating connections between the nodes by:
     applying credential classification data inputs of a second training data to the input layer of nodes of the neural network; and
     adjusting connections and weights, using a training algorithm, between nodes in adjacent layers of the neural network to produce values for attribute match data outputs at the outer layer of nodes of the neural network; and
   generating the attribute match datum as a function of the credential classification datum using the trained neural network.

* * * * *